(12) United States Patent
Henry et al.

(10) Patent No.: US 6,538,766 B1
(45) Date of Patent: Mar. 25, 2003

(54) CONVERSION OF DIGITAL DATA INTO BIT-MAP MODE

(75) Inventors: Félix Henry, Rennes (FR); Jean-Jacques Moreau, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/716,428

(22) Filed: Nov. 21, 2000

(30) Foreign Application Priority Data

Nov. 22, 1999 (FR) ............................................. 99 14655

(51) Int. Cl.$^7$ ................................................. G06K 1/00
(52) U.S. Cl. ........................ 358/1.16; 358/1.8; 358/1.9; 358/1.2; 358/1.18; 358/1.13; 358/1.12; 395/112; 395/114; 395/115; 395/116; 395/164; 395/165; 345/189; 345/133; 345/201; 345/127; 341/51
(58) Field of Search ................................ 395/112, 114, 395/115, 116, 164, 165, 166, 109, 110, 117, 129, 133, 135, 141, 147; 358/404, 444, 296, 1.8, 1.9; 345/189, 133, 201, 127; 364/518, 519, 521; 340/750, 799, 723, 731

(56) References Cited

U.S. PATENT DOCUMENTS 4,896,275 A * 1/1990 Jackson ...................... 364/519
5,805,174 A * 9/1998 Ramchandran ............. 345/501
5,971,633 A * 10/1999 Sano ............................ 400/61

FOREIGN PATENT DOCUMENTS

EP           0887763 A2     12/1998     .......... G06K/15/02

* cited by examiner

Primary Examiner—Michael Tokar
Assistant Examiner—Linh Van Nguyen
(74) Attorney, Agent, or Firm—Fitzpatrick, Cella, Harper & Scinto (57) ABSTRACT

The invention concerns a method of converting, into bit-map mode, digital data representing physical quantities, in order to transmit the converted data from a first data processing device to a second data processing device, including the steps of:

forming bands of data to be converted, the bands having a predetermined height (HB), forming blocks in each band previously formed, characterised in that the blocks have a block width (LBL) which is determined (E2) as a function of the memory available in the second device, the blocks have a block height (HBL) which is determined (E3) as a function of the memory available in the first device.

36 Claims, 9 Drawing Sheets

CONVERSION OF DIGITAL DATA INTO BIT-MAP MODE

BACKGROUND OF THE INVENTION

1. Field of the Invention

The present invention concerns the conversion of digital data into bit-map mode.

2. Description of the Related Art

In a computer, an electronic document includes a collection of objects such as text, image or vectorised drawing (that is to say a set of geometric figures).

In order to be able to print this document, it is necessary to translate it into a representation which can be interpreted by the printer. For example, an inkjet printer processes information of the array of dots type, each dot containing the information for distributing ink at a precise coordinate of the printing medium, such as a sheet of paper. The concern here is therefore with the conversion of a document into bit-map mode, so that it becomes possible for the document to be interpreted for the printer.

A printer generally prints a document band by band, a band corresponding to the width of the print head.

Moreover, it is known that the array of dots obtained can be compressed for the purpose of reducing the transmission time and pass band required between the computer and the printer.

The patent application Ser. No. 99/02303 filed by the applicant presents a compression technique in which a digital signal is decomposed into signals of frequency sub-bands, this decomposition being effected by blocks of samples.

The document U.S. Pat. No. 5,638,498 presents a technique of conversion into bit-map mode in which the data are processed by blocks.

BRIEF SUMMARY OF THE INVENTION

In this context, the invention aims to provide a method and device or conversion into bit-map mode which allows processing by band, whilst minimising the memory size necessary for storing the data in the course of processing.

To this end, the invention proposes a method of converting, into bit-map mode, digital data representing physical quantities, in order to transmit the converted data from a first data processing device to a second data processing device, including the steps of:

forming bands of data to be converted, the bands having a predetermined height, forming blocks in each band previously formed, characterised in that the blocks have a first block size parameter which is determined according to at least one characteristic of the first device.

The invention also relates to a method of converting, into bit-map mode, digital data representing physical quantities, in order to transmit the converted data from a first data processing device to a second data processing device, including the steps of:

forming bands of data to be converted, the bands having a predetermined height, forming blocks in each band previously formed, characterised in that the blocks have a second block size parameter which is determined according to at least one characteristic of the second device.

The invention concerns a method which combines the characteristics of the two methods presented above.

Correlatively, the invention concerns a device for converting into bit-map mode digital data representing physical quantities, in order to transmit the converted data to a second data processing device, having:

means of forming bands to be converted, the bands having a redetermined height, means of forming blocks in each previously formed band, characterised in that the block formation means are adapted to form the blocks so that:

the blocks have a first block size parameter which is determined according to at least one characteristic of the first device.

The invention also relates to a device for converting into bit-map mode digital data representing physical quantities, in order to transmit the converted data to a second data processing device, having:

means of forming bands to be converted, the bands having a predetermined height, means of forming blocks in each previously formed band, characterised in that the block formation means are adapted to form the blocks so that:

the blocks have a second block size parameter which is determined according to at least one characteristic of the second device.

The invention also concerns a device which combines the characteristics of the devices presented above.

By virtue of the invention, the memory size necessary for storing the data in the course of processing during their conversion into bit-map mode and their compression is reduced, whilst preserving a good quality of reproduction of the printed document.

According to preferred characteristics, which may be combined:

the first parameter is a block height, the at least one first characteristic is the memory available in the first device, the second parameter is a block width, the at least one second characteristic is the memory available in the second device.

These characteristics allow a simple and economical implementation of the invention.

According to a preferred characteristic, the second device is a printer and the band height is determined according to the size of the print head of the printer.

According to another preferred characteristic, the blocks overlap in pairs over a predetermined overlap width, preferably equal to one sample. The overlap makes it possible to retrieve the data without loss, and the overlap of a sample is a minimum overlap which minimises the memory occupation of the data.

According to another preferred characteristic, the block width is determined so that the product of the band height and the block width minus the overlap width does not exceed the memory size available in the printer.

According to another preferred characteristic, the block height is determined so that the product of the block height, minus the overlap width, and the block width, also minus the overlap width, does not exceed the memory size available in the computer.

According to another preferred characteristic, the block height is determined so that the band height is an integer multiple of the block height.

The above block size characteristics make it possible to adapt the conversion into bit-map mode to the performance of the devices used.

According to another preferred characteristic, the data are processed band by band, and then in each band the data are processed block by block, and the blocks are processed so that:

the blocks are processed column by column, the blocks in any column are all processed before passing to another column, the columns of blocks are processed in the order of their printing by the print head.

The order of processing of the blocks optimises the memory occupation of the data in the course of processing.

According to another preferred characteristic, the method includes the steps of:

translation of each block into frequency sub-bands, quantisation of the samples of the frequency sub-bands, and entropic coding of the quantised samples.

Thus the data converted into bit-map mode are compressed before being transmitted to the printer.

The device has means of implementing the characteristics disclosed above.

The invention also concerns a digital apparatus including the device or means of implementing the method.

The invention also concerns a system including the previously disclosed device connected to a printer.

The advantages of the device, of the digital apparatus and of the system are identical to those previously disclosed.

The invention also concerns an information storage means which can be read by a computer or by a microprocessor, integrated or not into the device, possibly removable, and stores a program implementing the method disclosed above.

The invention also concerns a computer program product comprising instructions for implementing the method disclosed above.

BRIEF DESCRIPTION OF THE DRAWINGS

The characteristics and advantages of the present invention will emerge more clearly from a reading of the preferred embodiment illustrated by the accompanying drawings, in which.

DETAILED DESCRIPTION OF THE INVENTION

Figure 1:
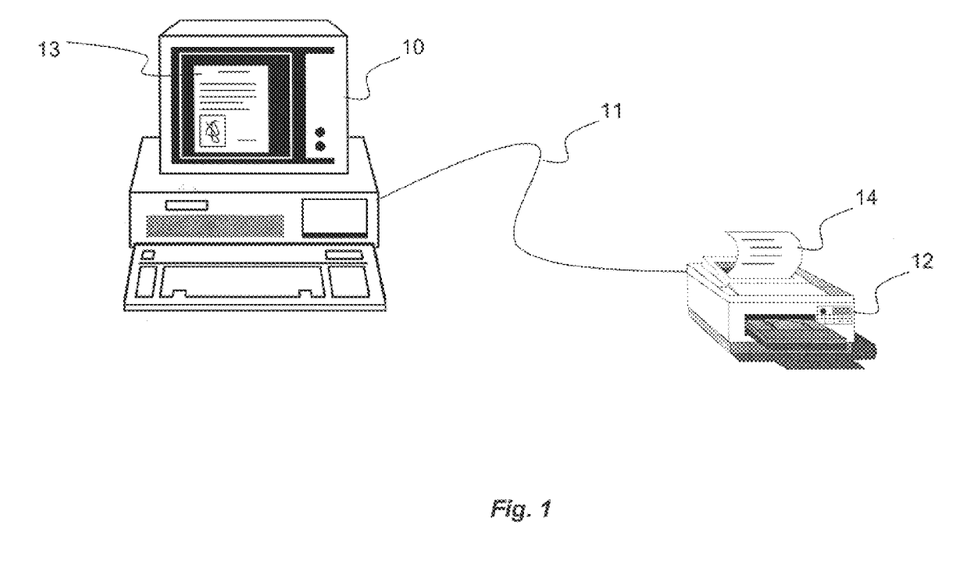
FIG. 1 depicts a computer connected to a printer, in which the invention is implemented.

According to the chosen embodiment depicted in FIG. 1, a computer 10 is connected to a printer 12 by means of a cable 11. An electronic document 13 is in the course of processing by the computer 10. In particular, the electronic document 13 must be printed on a sheet 14 by the printer 12.

Naturally, as a variant, the computer and printer can be integrated into the same apparatus.

Figure 2:
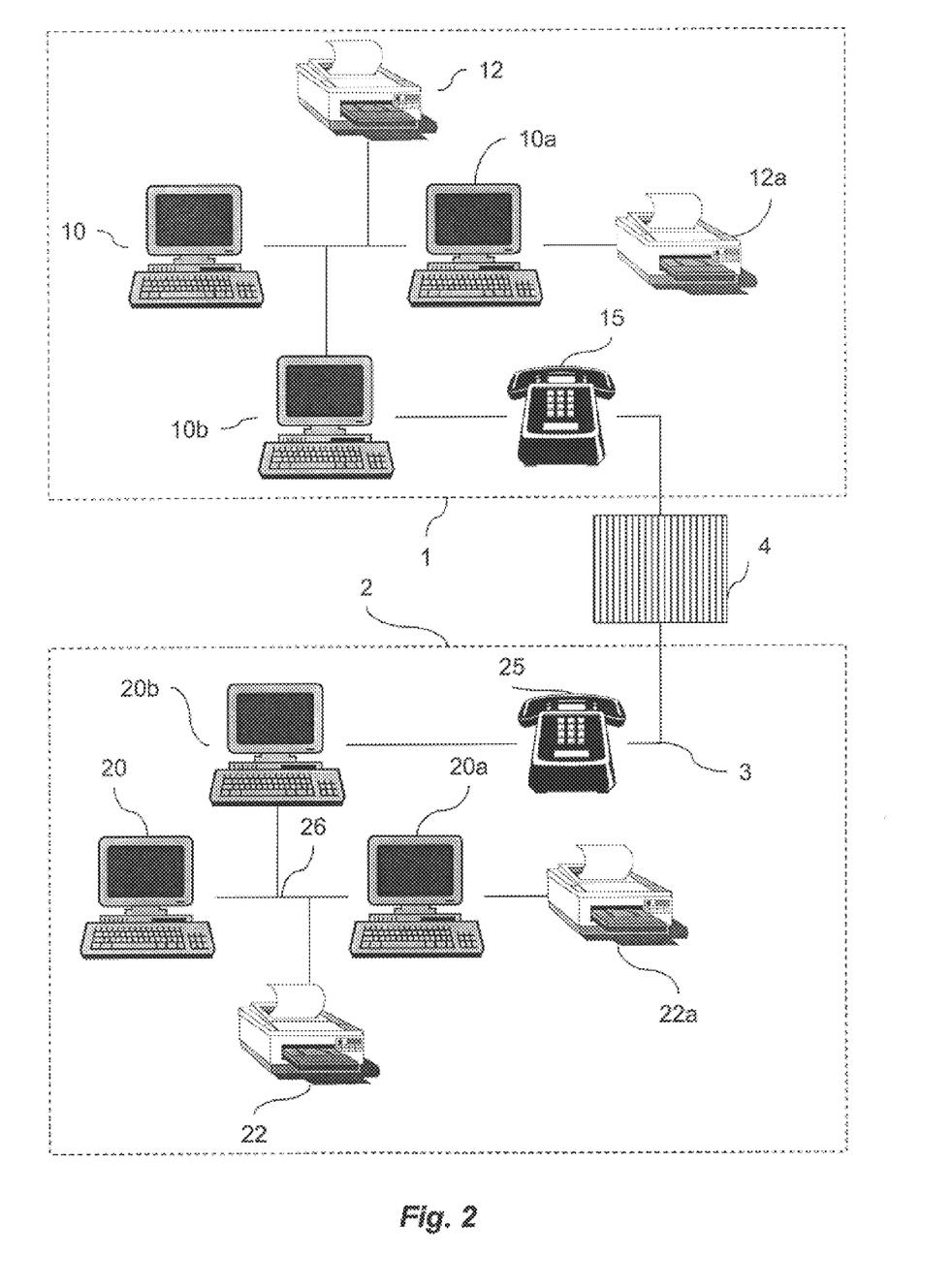
FIG. 2 depicts a computer network in which the invention is implemented.

FIG. 2 depicts a computer network 1 including the computer 10, the printer 12 and several other computers, here 10a and 10b, and another printer 12a. These different items of equipment are connected by a network 16, for example an Ethernet network.

The network 1 can include equipment of different types, for example a facsimile machine, a modem, a scanner, an electronic whiteboard including or connected to a printer and more generally any device for acquiring or depicting computer data.

The architecture of the network and the type of connection may be of any type and are not described here. The network may be cabled, or wireless.

The network 1 is connected to a second network 2 which is similar to it and which includes computers 20, 20a and 20b, and printers 22 and 22a. These different items of equipment are connected by a network 26, for example an Ethernet network.

The computers 12b and 20b are connected respectively to modems 15 and 25. The modems 15 and 25 are connected together via a network 3, which is for example the switched telephone network. A switch 4 which is situated at an access supplier common to the two networks 1 and 2 is interposed between the modems 15 and 25.

The two networks 1 and 2 can communicate with each other. In particular, a user of one of the networks can use the components of the other network as if they belonged physically to the first network. For example, an electronic document stored on the computer 10 can be printed either by one of the printers 12 or 12a of the network 1, or 22 or 22a of the network 2.

Figure 3:
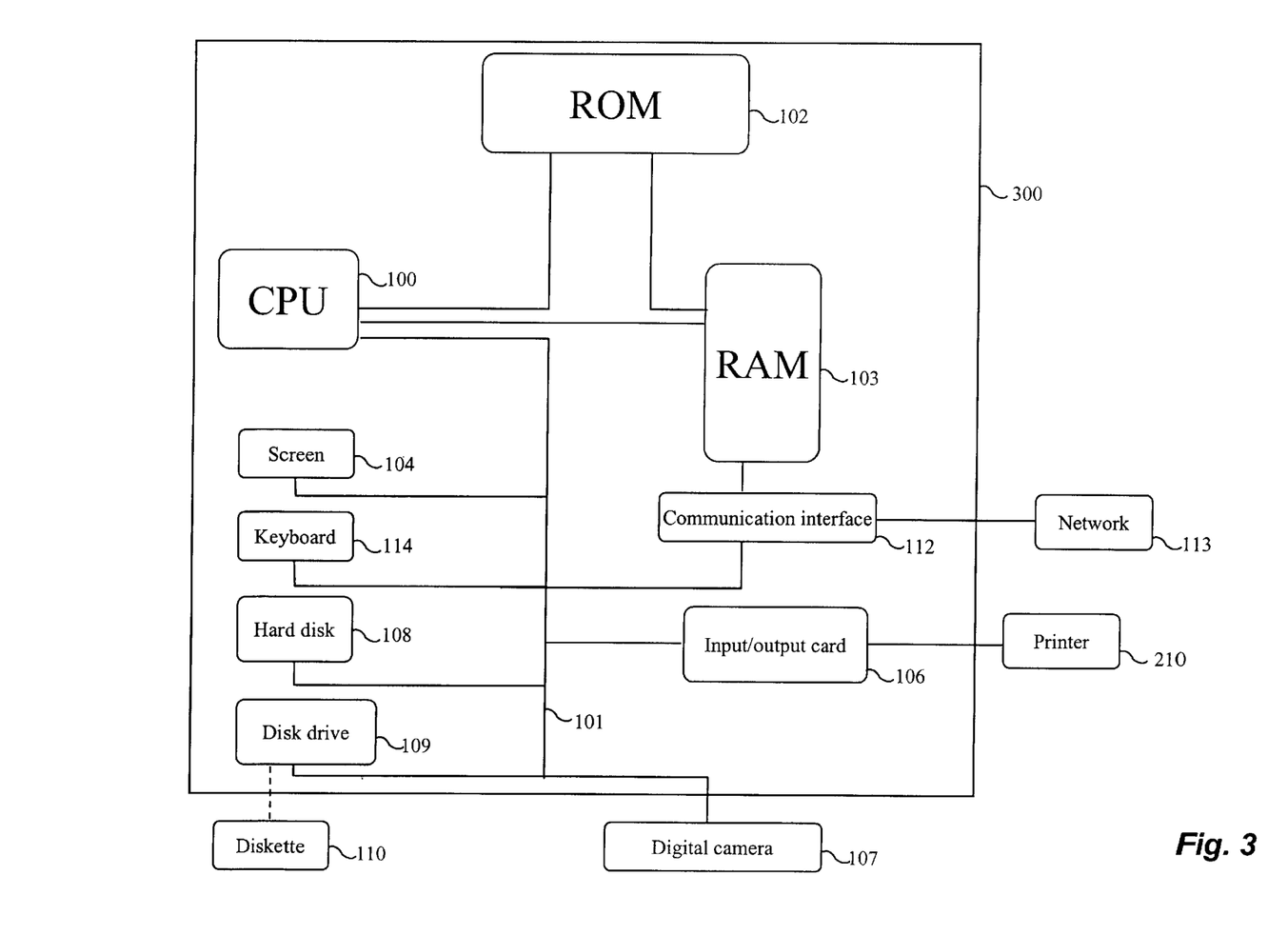
FIG. 3 depicts an embodiment of a device according to the invention.

With reference to FIG. 3, an example of a device 300 implementing the invention is described. This device is integrated into a printer, or preferably is included in a computer connected to different peripherals, including notably a printer 210.

The device 300 has a communication bus 101 to which there are connected:

a central unit 105, a read only memory 102, a random access memory 103, a screen 104, a keyboard 114, a hard disk 108, a disk drive 109 adapted to receive a diskette 110, an input/output card 106 connected to the printer 210, an interface 112 for communication with a communication network 113.

The hard disk 108 stores the programs implementing the invention, and which will be described hereinafter, as well as the data to be processed according to the invention. These programs can also be read on the diskette 110 or received via the communication network 113, or again stored in the read only memory 102.

In more general terms, the programs according to the present invention are stored in a storage means. This storage means can be read by a computer or by a microprocessor. This storage means is integrated or not into the device, and may be removable. For example, it can include a magnetic tape, a diskette or a CD ROM (fixed-memory compact disc).

When the device is powered up, the programs according to the present invention are transferred into the random access memory 103, which then contains the executable code of the invention and registers containing the variables necessary for implementing the invention. The random access memory includes a buffer.

The device 300 can receive data to be processed from a peripheral device 107, such as a digital camera, a digital photographic apparatus or a scanner, or any other means of acquiring or storing data.

The device 300 can also receive data to be processed from a distant device, via the communication network 113, and transmit data to be processed to a distant device, again via the communication network 113.

The screen 104 enables a user notably to display the data to be processed, and serves, with the keyboard 114, as a user interface.

Figure 4:
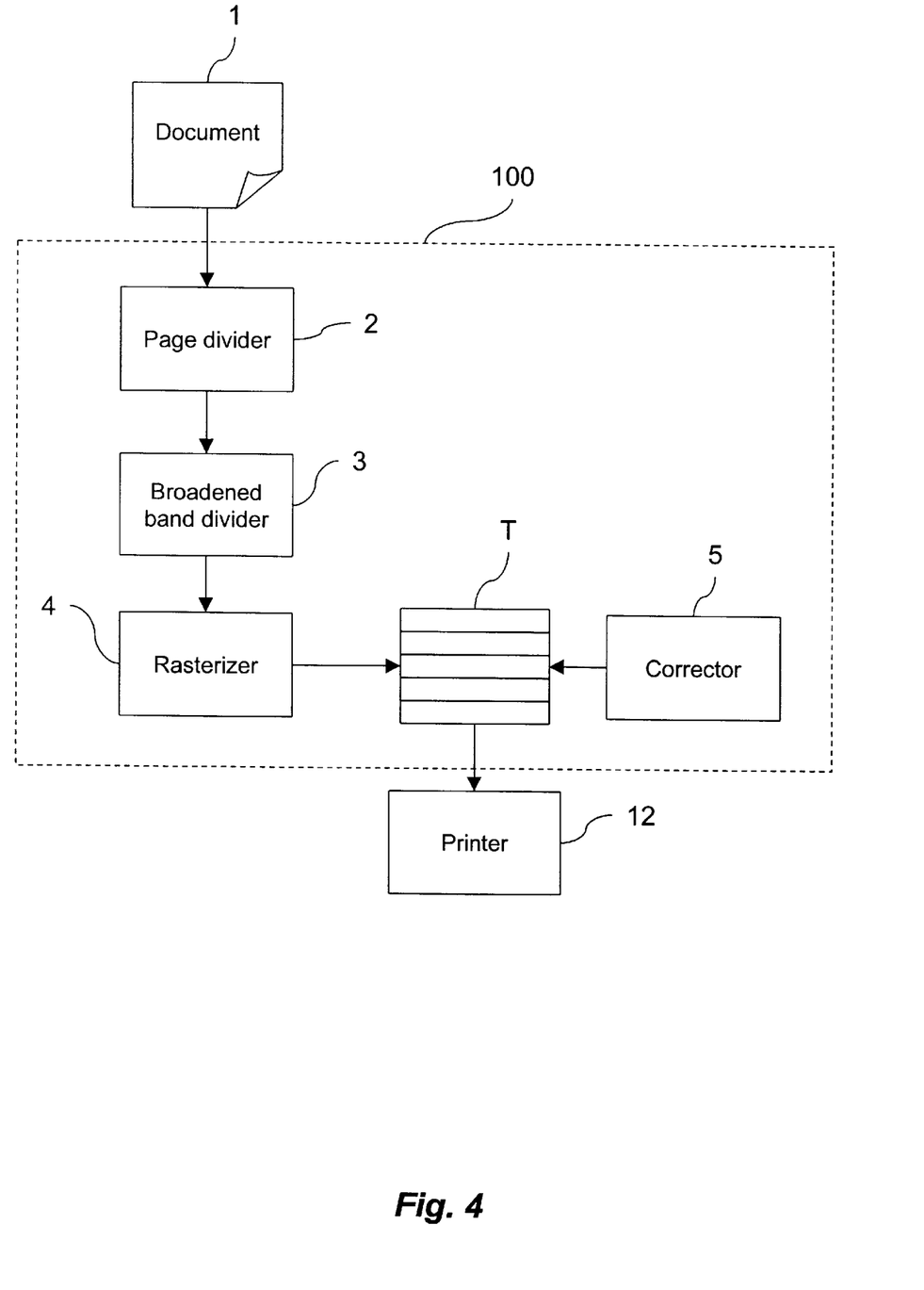
FIG. 4 depicts an embodiment of a device according to the invention.

With reference to FIG. 4, an embodiment of a device 100 according to the invention includes a page divider 2 which divides an electronic document 1 stored in the form of a file into groups of information, each group representing a page. Each page includes a part of the document, which depends notably on the format chosen for the reproduction and size of the sheets of paper.

Figure 5:
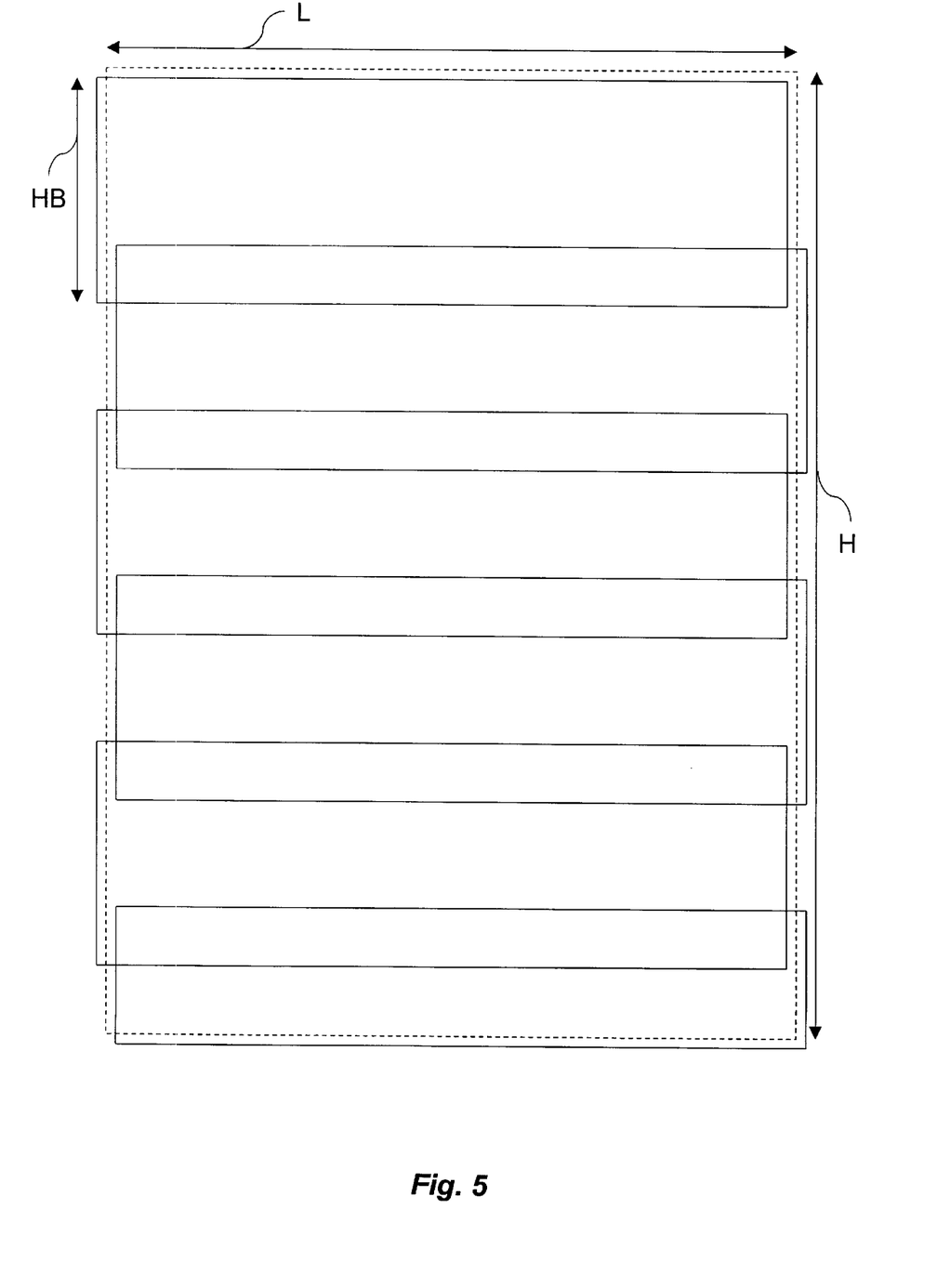
FIG. 5 depicts a page of a document processed in accordance with the present invention.

The page divider is connected to a broadended-band divider 3, which divides the pages into overlapping bands, as depicted in FIG. 5.

FIG. 5 depicts an electronic document of height H and width L, which is divided into bands of width L and height HB. The band height HB is determined according to the size of the print head of the printer. More precisely, a band consists of data which the print head can print without vertical movement of the sheet.

It should be noted that the bands do not necessarily all have the same height. Notably, the last band can have a height less than that of the other bands.

Naturally, the bands may not overlap and may be adjacent.

The divider 3 is connected to a system for converting into bit-map mode 4.

An electronic document is a collection of objects such as text, image or vectorised drawing (set of straight lines, circles, etc). In order to print this document, a translation into a representation which can be interpreted by the printer is necessary. A printer processes the data of the array of dots type, each dot containing information on the distribution of ink at precise coordinates of the printing medium, generally a sheet of paper, in the case of an inkjet printer.

Hereinafter, such a conversion into bit-map mode will be referred to as rasterizing.

The broadened band data determined by the divider 3 are transmitted to the conversion system 4, which transforms them into at least one array T describing part of a chromatic component of the document. Each cell in the array represents a dot and contains the coordinates of this dot and information representing the fact that the dot is "switched" on or not.

In this example, the part of the chromatic component corresponds to the broadened band in the course of processing. If the document is in black and white, the conversion system 4 generates and fills a single array. If the document is in colour, the conversion system 4 generates and fills as many arrays as there are chromatic components necessary for printing the document.

The array T is then processed by a corrector 5 which, if necessary, applies modifications to the switched-on dots so as to improve the quality of the document to be printed.

The array T is then transmitted to the printer 12. The latter is of the inkjet type, or laser type, for example.

Figure 6:
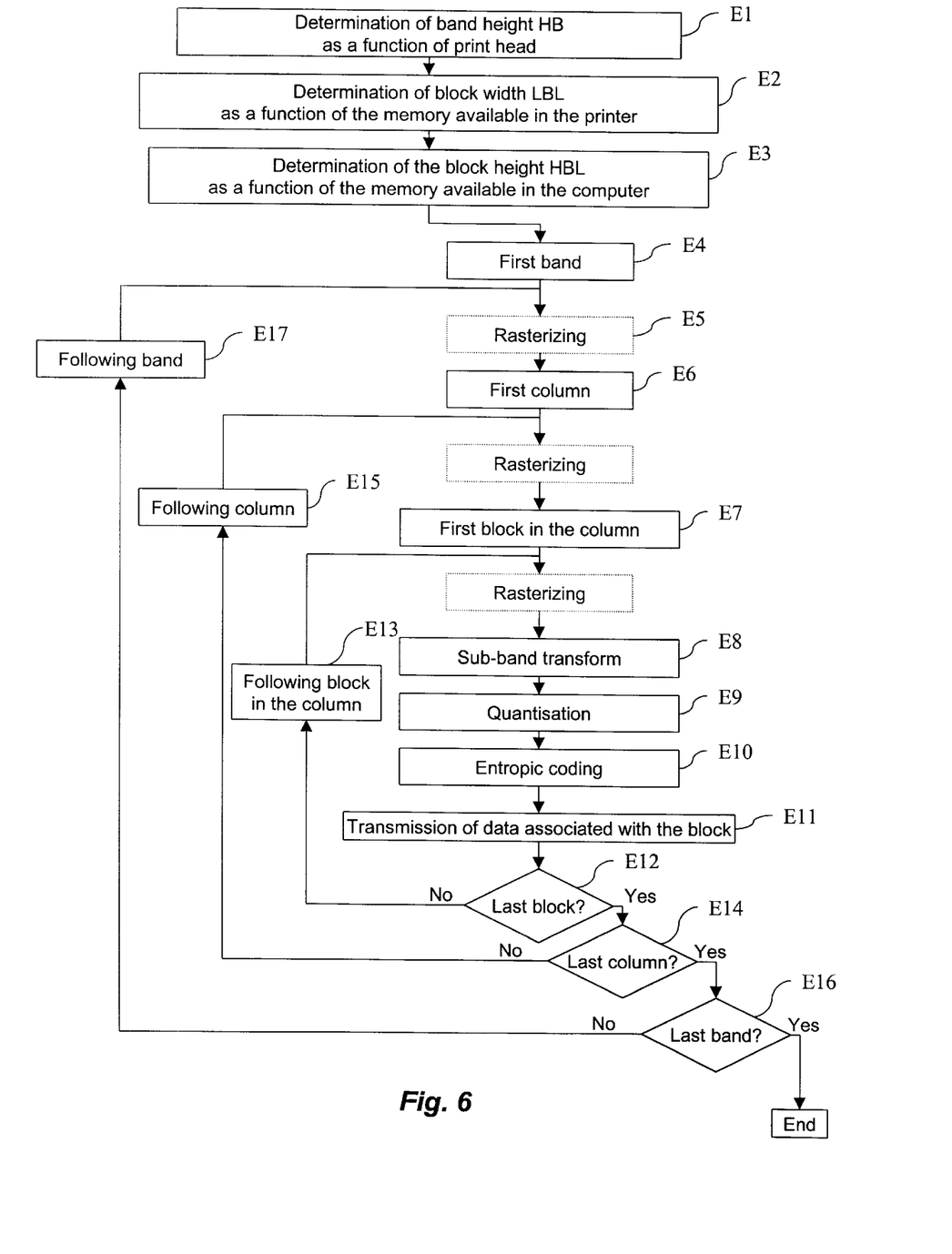
FIG. 6 depicts an algorithm for processing a document page, according to the present invention.

FIG. 6 depicts an embodiment of a method of converting into bitmap mode and coding a page of a document, according to the present invention. This method is implemented in the previously described device and includes steps E1 to E17.

The algorithm can be stored in whole or in part in any information storage means capable of cooperating with a microprocessor. This storage means can be read by a computer or by a microprocessor. This storage means is integrated or not into the device, and may be removable. For example, it may have a magnetic tape, a diskette or a CD ROM (fixed-memory compact disk).

Step E1 is the determination of the band height HB as a function of the print head.

Figure 7:
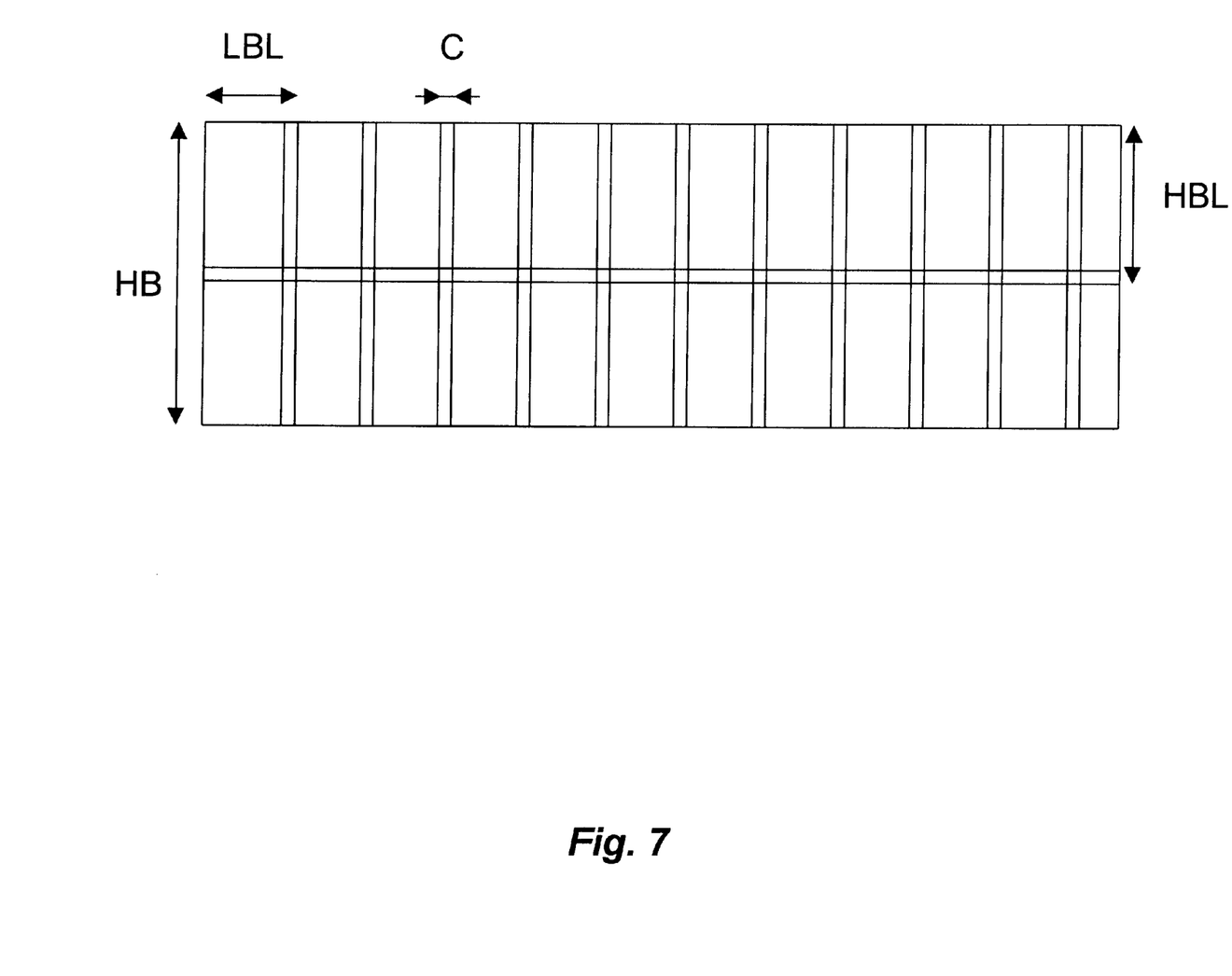
FIG. 7 depicts a band formed in the page in the course of processing according to the present invention.

FIG. 7 depicts a band of height HB. As disclosed previously, the height HB is determined according to the size of the print head of the printer. The bands formed are here horizontal, which corresponds to a horizontal movement of the print head. However, if the movement of the print head is vertical, the bands formed are also vertical.

The following step E2 is the determination of the block width LBL as a function of the memory available in the printer. The blocks overlap in pairs over an overlap width of C dots and form columns of width LBL.

The printer must process all the blocks in a column in order to be able to move forward the print head by the width of (LBL−C) dots. For this purpose, it is necessary to store HB×(LBL−C) dots in the printer memory. The value of the block width LBL is therefore determined so that the value HB×(LBL−C) does not exceed the memory size available in the printer, or in other words, so that the product of the band height and the band width minus the overlap width does not exceed the memory size available in the printer.

The following step E3 is the determination of the block height HBL as a function of the memory available in the computer.

Each column containing HB×(LBL−C) dots which is processed by the printer is first of all processed by the computer. In order to minimise the working memory in the computer, each column can be divided into blocks. The block height HBL is determined so that the column includes an integer number of blocks, that is to say if there exists an integer number k such that HB=k.(HBL−C).

In addition, a block must be able to be stored entirely in the working memory, and therefore HBL is chosen so that the data of the (HBL−C)×(LBL−C) dots of a block can be stored in the working memory of the computer, or in other words so that the product of the block height, minus the overlap width, and the block width, also minus the overlap width, does not exceed the memory size available in the computer.

It should be noted that the last column of the band can have a different width from the previous ones, and can in particular be less wide, where the band width is not a multiple of the block width.

All the band, column or block dimensions are expressed in numbers of samples, or numbers of dots.

The following step E4 is an initialisation for considering the first band to be processed.

The following step E5 is the rasterizing of the current band.

The following step E6 is an initialisation for considering the first column of the current band.

The following E7 is an initialisation for considering the first block of the current column.

It should be noted that the rasterizing step can also be carried out after step E6 or after step E7, as depicted by the steps in dotted lines.

The following step E8 is the transformation of the current block into frequency sub-bands. This step is effected as described in French patent application No 99/02303 filed by the applicant.

It should be noted that, as disclosed in this patent application, the overlap between adjacent blocks can have a width C equal to one sample, so as to minimise the memory occupation of the data processed.

Step E8 is followed by step E9, which is the quantisation of the frequency sub-bands previously determined.

The following step E10 is the entropic coding of the frequency subbands previously quantised.

The following step E11 is the transmission of the data previously processed and corresponding to the current block to the printer. As a variant, it is possible to temporarily store these data in a memory of the computer, in order to group them together with the data from other blocks and make a grouped transmission.

Figure 8:
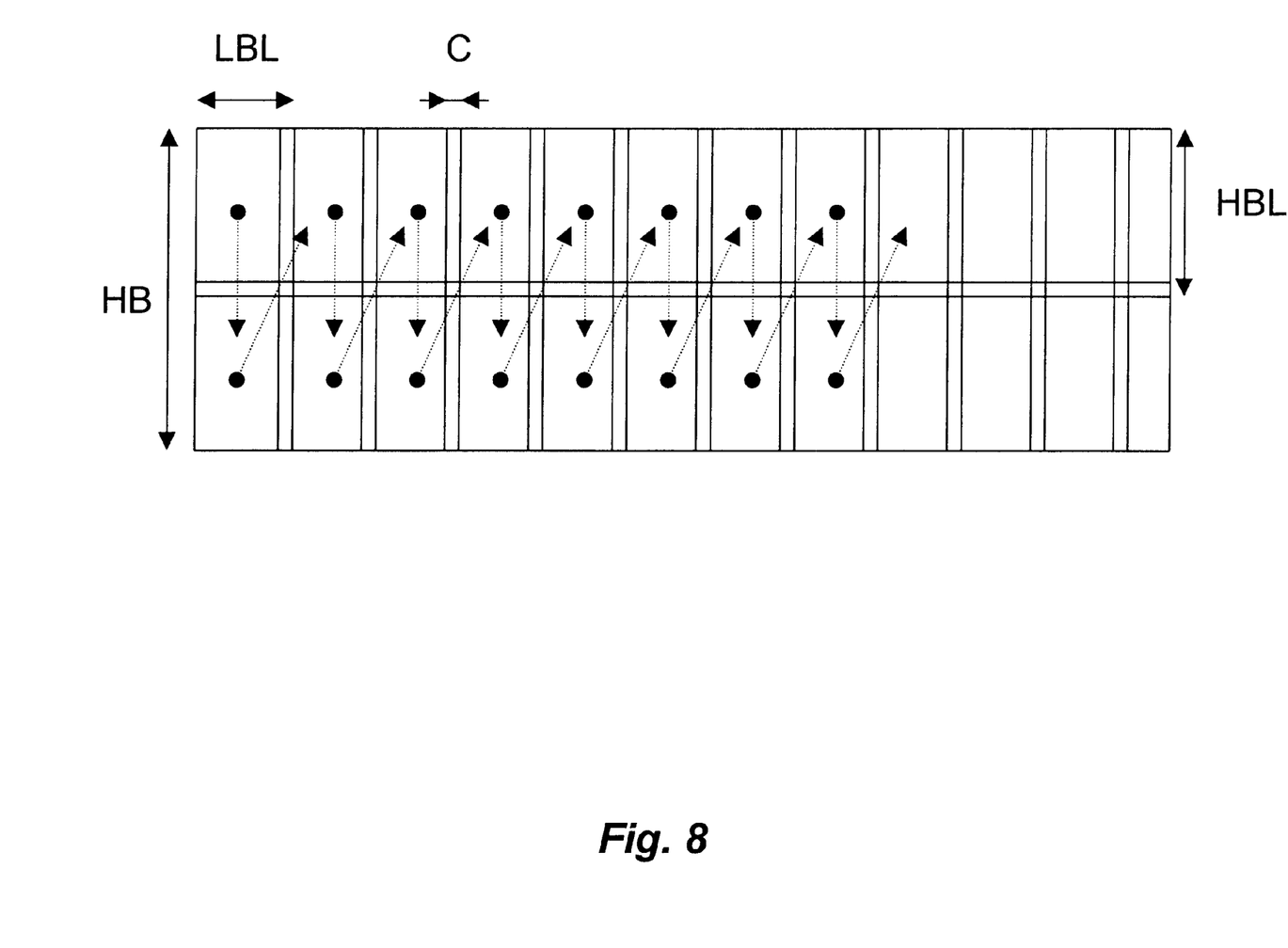
FIG. 8 depicts an order of processing blocks formed in the band depicted in the previous figure.

The following step E12 is a test for determining whether all the blocks in the current column have been processed. If the response is negative, then this step is followed by step E13 in order to consider a following block. As depicted in FIG. 8, the blocks are processed so that:

the columns of blocks are processed in the order of their printing by the print head, the blocks in any column are all processed before passing to another column.

Step E13 is followed by the previously described step E8.

If the response is positive at step E12, then this step is followed by step E14 which is a test for determining whether all the columns in the current and have been processed. If the response is negative, then this step is followed by step E15 in order to consider a following column. The columns are considered in the order of printing. Step E15 is followed by the previously described step E7.

If the response is positive at step E14, then this step is followed by step E16, which is a test for determining whether all the bands have been processed. If the response is negative, then this step is followed by step E17 in order to consider a following band. The bands are considered in the order of printing. Step E17 is followed by the previously described step E5.

When the response is positive at step E16, then the use of the algorithm is ended.

Figure 9:
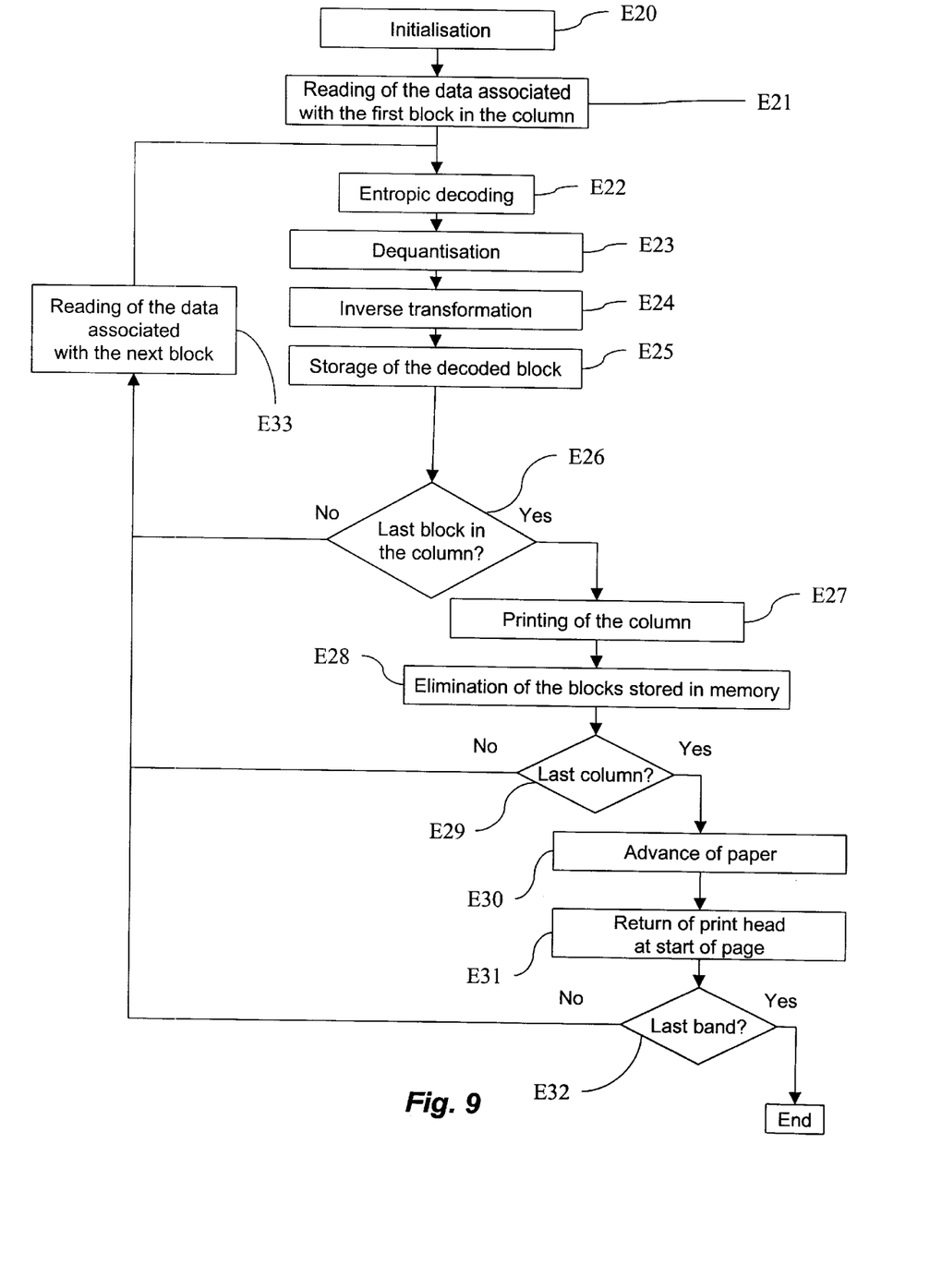
FIG. 9 depicts an algorithm for processing a document page, according to the present invention.

FIG. 9 depicts an embodiment of a method of processing a page of a document in a printer, according to the present invention. The data transmitted by the computer are first of all stored in the printer, and are then printed according to the method which has been described. This method is implemented in the previously described device and includes steps E20 to E23.

The algorithm can be stored in whole or in part in any information storage means capable of cooperating with a microprocessor. This storage means can be read by a computer or by a microprocessor. This storage means is integrated or not into the device, and may be removable. For example, it can include a magnetic tape, a diskette or a CD ROM (fixed-memory compact disc).

Step E20 is an initialisation at which the print head is placed at the start of the page, and the first column in the first band is considered.

The following step E21 is the reading of the data in the first block in the column under consideration. The order of reading of the blocks is determined by their order of printing.

The following step E22 is the entropic decoding of the data previously read. Operations which are the reverse of those carried out at step E10 are here carried out.

The following step E23 is the dequantisation of the previously decoded data. This step corresponds to the previously described step E9.

The following step E24 is the inverse transformation of the previously dequantised data. This step corresponds to the previously described step E8.

The following step E25 is the storage of the decoded data in the current block.

The following step E26 is a test for determining whether the current block is the last in the column currently being processed. If the response is negative, step E26 is followed by step E33, at which the following block is considered and the data of this block are read. Step E33 is followed by the previously described step E22.

When the response is positive at step E26, the latter is followed by step E27, at which the current column is printed. The data corresponding to the blocks of the printed column are erased from the memory at step E28.

The following step E29 is a test for determining whether the current column is the last in the band currently being processed. If the response is negative, step E29 is followed by step E33, at which the following block is considered and the data in this block are read. This block is here the first block of the following column. Step E33 is followed by the previously described step E22.

If the response is positive at step E29, this means that the band currently being processed is completely printed and this step is followed by a step E30 at which the printing medium, generally a sheet of paper, is made to advance.

The following step E31 is the return of the print head to the start of page.

The following step E32 is a test for determining whether the band which has just been printed is the last one. If the response is negative, then this step is followed by the previously described step E33, in order to consider the first block in the following band.

When the response is positive at step E32, then the printing of the page is terminated.

Naturally, the present invention is in no way limited to the embodiments described and depicted, but quite the contrary encompasses any variant within the capability of a person skilled in the art.

In particular, the embodiment of the invention has been described for a computer and a printer. However, the invention applies to any means of acquiring data, such as a scanner, electronic whiteboard and any image formation means, such as a computer or computer screen, for example.

What is claimed is:

1. A method of converting, into bit-map mode, digital data representing physical quantities, in order to transmit the converted data from a first data processing device to a second data processing device, including the steps of:

forming bands of data to be converted, the bands having a predetermined height (HB); and forming blocks in each band previously formed, wherein the blocks have a first block size parameter (HBL) which is determined (E3) according to at least one characteristic of the first data processing device, and the blocks overlap in pairs over a predetermined overlap width (C).

2. A method according to claim 1, wherein the first parameter is a block height (HBL).

3. A method according to claim 2, wherein the block height (HBL) is determined so that the product of the block height, minus the overlap width, and the block width, also minus the overlap width, does not exceed the memory size available in the first data processing device.

4. A method according to claim 2, wherein the block height (HBL) is determined so that the band height (HB) is an integer multiple of the block height (HBL).

5. A method according to claim 1, wherein the at least one first characteristic is the memory available in the first device.

6. A method according to claim 1, wherein the second data processing device is a printer and in that the band height (HB) is determined as a function of the size of the print head of the printer.

7. A method according to claim 1, wherein the blocks overlap in pairs over a predetermined overlap width (C) equal to one sample.

8. A method according to claim 1, wherein the data are processed band by band, and then in each band the data are processed block by block, and the blocks are processed so that:
   the blocks are processed column by column,
   the blocks in any column are all processed before passing to another column,
   the columns of blocks are processed in the order of their printing by the print head.

9. A method according to claim 1, wherein the data are processed band by band, and then in each band the data are processed block by block, and in that it includes the steps of:
   transformation (E8) of each block into frequency sub-bands,
   quantisation (E9) of the samples of the frequency sub-bands, and
   entropic coding (E10) of the quantised samples.

10. A digital signal processing apparatus, wherein the digital signal processing apparatus has means adapted to implement the method according to claim 1.

11. A storage medium storing a program for implementing a method according to claim 1.

12. A storage medium according to claim 11, wherein said storage medium is detachably mountable on the first data processing device.

13. A storage medium according to claim 12, wherein said storage medium is a floppy disk or a CD-ROM.

14. A computer program product comprising instructions for implementing a method according to claim 1.

15. A method of converting, into bit-map mode, digital data representing physical quantities, in order to transmit the converted data from a first data processing device to a second data processing device, including the steps of:
   forming bands of data to be converted, the bands having a predetermined height (HB); and
   forming blocks in each band previously formed,
   wherein
      the blocks have a second block size parameter (LBL) which is determined (E2) according to at least one characteristic of the second data processing device, and
      the blocks overlap in pairs over a predetermined overlap width (C).

16. A method according to claim 15, wherein the second parameter is a block width (LBL).

17. A method according to claim 16, wherein the block width (LBL) is determined so that the product of the band height and the block width minus the overlap width does not exceed the memory size available in the second data processing device.

18. A method according to claim 15, wherein the at least one second characteristic the memory available in the second data processing device.

19. A method of converting, into bit-map mode, digital data representing physical quantities, in order to transmit the converted data from a first data processing device to a second data processing device, including the steps of:
   forming bands of data to be converted, the bands having a predetermined height (HB); and
   forming blocks in each band previously formed,
   wherein
      the blocks have a first block size parameter (HBL) which is determined (E3) according to at least one characteristic of the first data processing device,
      the blocks have a second block size parameter (LBL) which is determined (E2) according to at least one characteristic of the second data processing device, and
      the blocks overlap in pairs over a predetermined overlap width (C).

20. A device, included in a first data processing device, for converting into bit-map mode digital data representing physical quantities, in order to transmit the converted data to a second data processing device, comprising:
   means for forming bands of data to be converted, the bands having a predetermined height (HB); and
   means for forming blocks in each previously formed band,
   wherein the block formation means are adapted to form the blocks so that
   the blocks have a first block size parameter (HBL) which is determined according to at least one characteristic of the first data processing device, and
   the means for forming the blocks forms the blocks so that the blocks overlap in pairs over a predetermined overlap width (C).

21. A device according to claim 20, wherein the means for forming blocks are adapted to consider a first parameter which is a block height (HBL).

22. A device according to claim 21, wherein the device is adapted to determine the block height (HBL) so that the product of the block height, minus the overlap width, and the block width, also minus the overlap width, does not exceed the memory size available in the second data processing device.

23. A device according to claim 21, wherein the device is adapted to determine the block height (HBL) so that the band height (HB) is an integer multiple of the block height (HBL).

24. A device according to claim 20, wherein the means for forming blocks are adapted to consider the at least one first characteristic which is the memory available in the first data processing device.

25. A device according to claim 20, wherein the second data processing device is a printer and the means for forming bands are adapted to determine the band height (HB) as a function of the size of the print head of the printer.

26. A device according to claim 20, wherein the means for forming the blocks forms the blocks so that the blocks overlap in pairs over a predetermined overlap width (C) equal to one sample.

27. A device according to claim 20, wherein the device is adapted to process the data band by band, and then in each band to process the data block by block, and to process the blocks so that:
   the blocks are processed column by column;
   the blocks in any column are all processed before passing to another column; and
   the columns of blocks are processed in the order of their printing by the print head.

28. A device according to claim 20, wherein the device is adapted to process the data band by band, and then in each band to process the data block by block, comprising:

means for transformation (E8) of each block into frequency sub-bands;

means for quantisation (E9) of the samples of the frequency sub-bands; and     means for entropic coding (E10) of the quantised samples.

29. A device (300) according to claim 20, wherein the means for forming bands and the means for forming blocks are incorporated in:

a microprocessor;

a read only memory containing a program for converting the data into bit-map mode; and     a random access memory containing registers adapted to record variables modified during the running of said program.

30. A data processing system, wherein the data processing system includes a device according to claim 20 and a printer, the device and printer being connected so as to cooperate.

31. A digital signal processing apparatus, wherein the digital signal processing apparatus includes the device according to claim 20.

32. A device for converting into bit-map mode digital data representing physical quantities, in order to transmit the converted data to a second data processing device, comprising:

means for forming bands of data to be converted, the bands having a predetermined height (HB); and     means for forming blocks in each previously formed band,     wherein the block formation means are adapted to form the blocks so that     the blocks have a second block size parameter (LBL) which is determined according to at least one characteristic of the second data processing device, and     the means for forming the blocks forms the blocks so that the blocks overlap in pairs over a predetermined overlap width (C).

33. A device according to claim 32, wherein the means for forming blocks are adapted to consider a second parameter which is the block width (LBL).

34. A device according to claim 33, wherein the device is adapted to determine the block width (LBL) so that the product of the band height and the block width minus the overlap width does not exceed the memory size available in the second data processing device.

35. A device according to claim 32, wherein the means for forming blocks are adapted to consider the at least one second characteristic which is the memory available in the second data processing device.

36. A device, included in a first data processing device, for converting into bit-map mode digital data representing physical quantities, in order to transmit the converted data to a second data processing device, comprising:

means for forming bands of data to be converted, the bands having a predetermined height (HB); and     means for forming blocks in each previously formed band,     wherein the block formation means are adapted to form the blocks so that     the blocks have a first block size parameter (HBL) which is determined according to at least one characteristic of the first data processing device,     the blocks have a second block size parameter (LBL) which is determined according to at least one characteristic of the second data processing device, and     the means for forming the blocks forms the blocks so that the blocks overlap in pairs over a predetermined overlap width (C).

* * * * *